F. A. ZIMMER.
POULTRY FEED BOX.
APPLICATION FILED DEC. 18, 1908.

994,296.

Patented June 6, 1911.
2 SHEETS—SHEET 1.

Witnesses:

Inventor
Frederick A. Zimmer
By James N. Ramsey
Attorney

F. A. ZIMMER.
POULTRY FEED BOX.
APPLICATION FILED DEC. 18, 1908.
994,296.
Patented June 6, 1911.
2 SHEETS—SHEET 2.
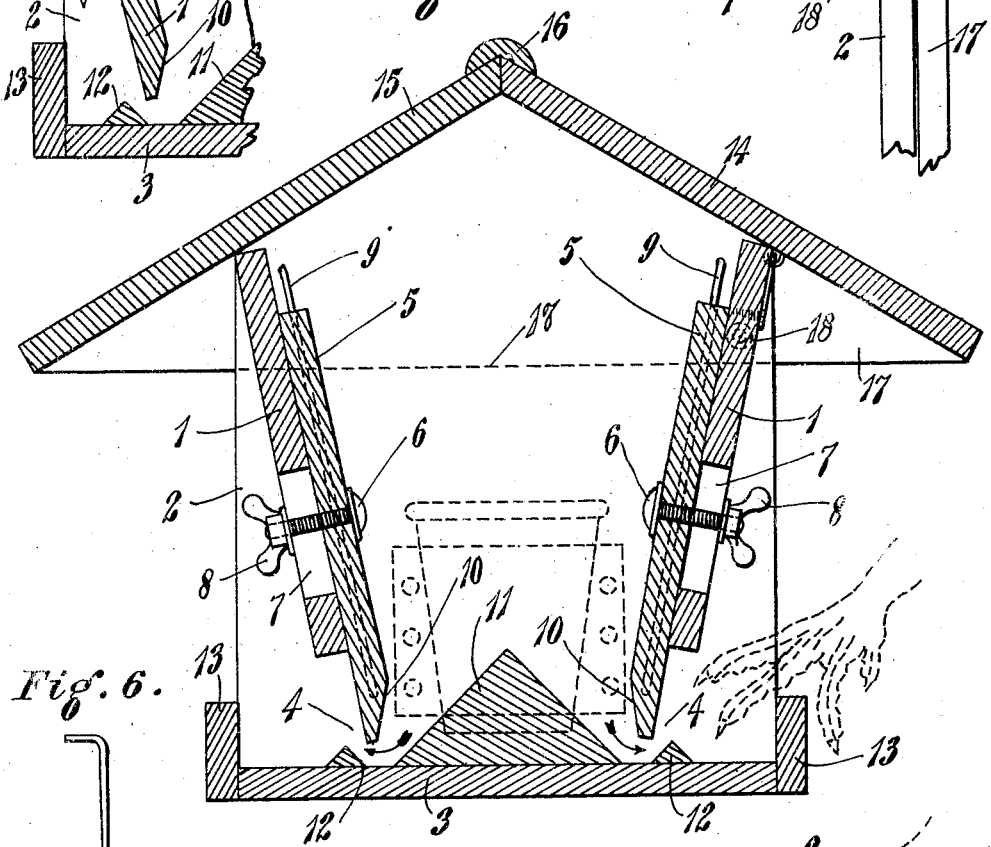
Witnesses:
Clarence Perdew
Florence Hammel
Inventor
Frederick A. Zimmer
By James F. Ramsey
Attorney

UNITED STATES PATENT OFFICE.

FREDERICK A. ZIMMER, OF COVINGTON, KENTUCKY.

POULTRY FEED-BOX.

994,296.

Specification of Letters Patent. Patented June 6, 1911.

Application filed December 18, 1908. Serial No. 468,142.

*To all whom it may concern:*

Be it known that I, FREDERICK A. ZIMMER, a citizen of the United States, residing at Covington, in the county of Kenton and State of Kentucky, have invented certain new and useful Improvements in Poultry Feed-Boxes, of which the following is a specification.

My invention relates to poultry feed troughs, and its object is to supply feed to poultry, such as chickens and pigeons, in only such quantity as is required by the birds, and to maintain the feed in a dry, cleanly and sanitary condition by protecting it both against the weather and against scattering and contamination by the birds.

My invention consists in a box having an opening in its side extending longitudinally thereof, adjacent to its bottom, and having its bottom inclined downwardly and outwardly toward said opening interiorly of its side, and upwardly and outwardly away from said opening exteriorly of the side, the bottom projecting past the side and being provided with a barrier adjacent to the opening, this opening forming a throat through which feed contained in the box may be fed gradually, and the barrier being adapted to prevent the scattering and contamination of the feed delivered through the throat.

My invention also consists in the parts and in the details of construction and arrangement of parts as will hereinafter be more fully described and claimed.

Figure 1:
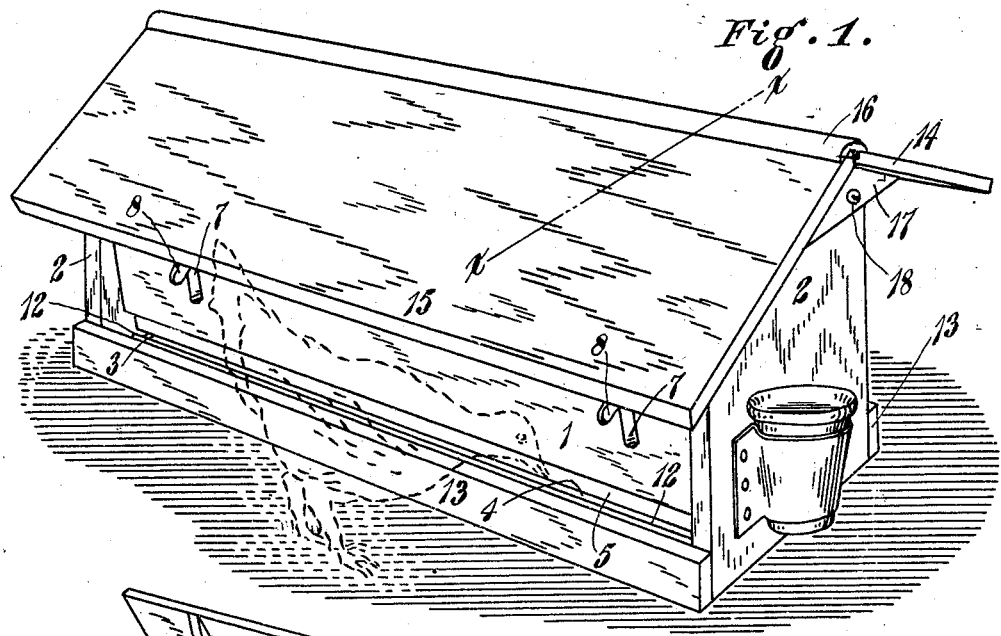
Figure 2:
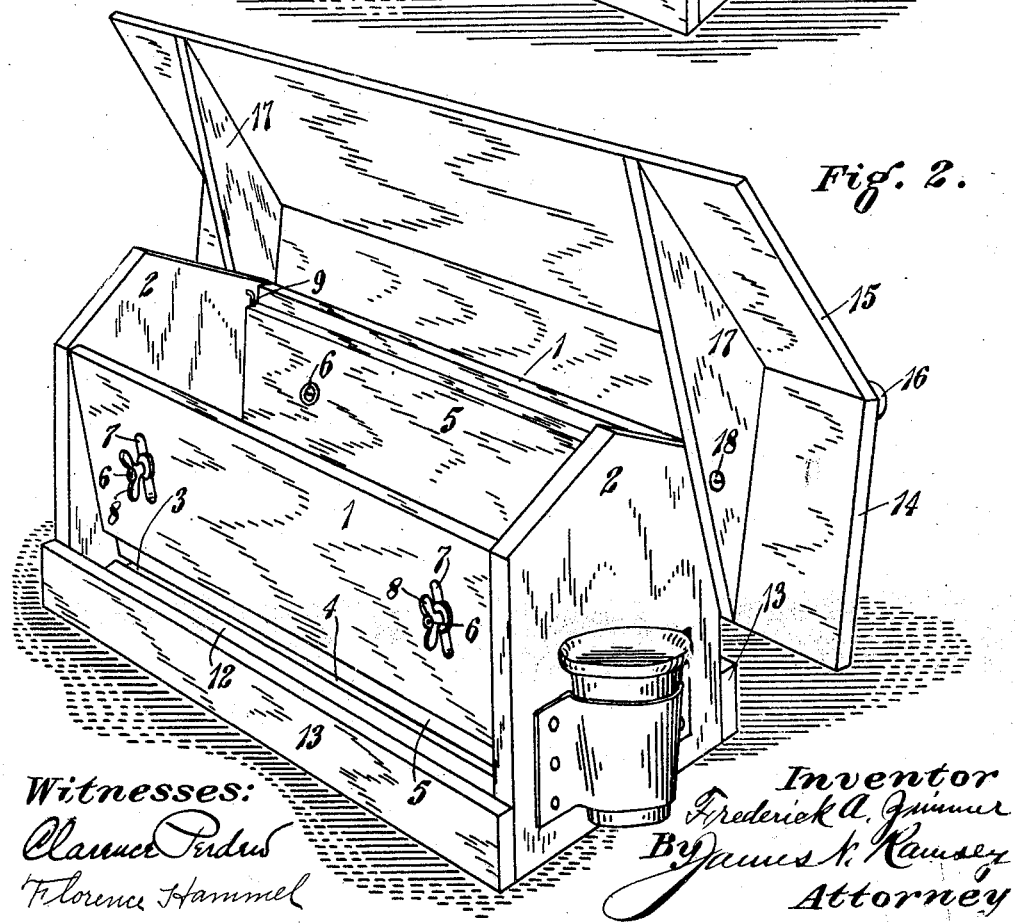

In the drawings: Figure 1 is a perspective view of a feed box embodying my invention, with the top closed and ready for use. Fig. 2 is a perspective view of the same with the top open. Fig. 3 is a cross section on a line corresponding to the line $x$—$x$ of Fig. 1, illustrating the operation of the barrier. Fig. 4 is a similar view illustrating a construction in which the width of the throat is not adjustable. Fig. 5 is a similar view illustrating the position of the bird in feeding, as well as the position of the feed in the box. Fig. 6 is a detail of one of the slides for the adjustable sides. Fig. 7 is a partial plan view illustrating the manner of hinging the lid to the box.

As I prefer to construct my improved feed box, it has the downwardly converging sides 1 attached at their ends to, and supported by, the ends 2 of the box. The bottom 3 of the box is also attached to the ends, but the sides 1 terminate short thereof, so that openings 4 are left between the upper surface of the bottom and the lower edges of the sides 1. As illustrated, these spaces 4 are of considerable width, and, in order to more or less obstruct said spaces to provide for supplying different kinds of feed or for feeding different kinds of birds, adjustable slides 5 are mounted interiorly of the sides 1, extending the full length thereof, and adapted to be adjusted vertically to bring their lower edges at different distances from the upper surface of the bottom 3. These slides 5 are mounted to be thus adjustable by means of bolts 6 rigidly mounted in the adjustable slides 5 and extending through vertical slots 7 in the sides 1. These bolts are provided with wing nuts 8 by means of which the adjustable slides 5 may be clamped at any desired position within the range of their adjustment as allowed by the slots 7. These adjustable slides 5 are mounted on guides 9 consisting in wires having their end parts bent at right angles to their main parts and these end parts inserted into the ends 2 of the box, so that the main part of the guide 9 extends parallel to the surface of the adjacent side 1. The adjustable slides 5 have grooves in their ends, into which the guides 9 are adapted to fit. Thus, the adjustable slides are held in alinement while they are being adjusted, preventing them from binding and wedging between the ends of the box. At the same time, the guides 9, fitting closely into the grooves in the ends of the adjustable slides 5, prevent the entrance of any particles of feed liable to hinder the ready adjustment of the slides.

The inner sides of the adjustable slides 5, adjacent to their lower edges, are beveled at a suitable angle as at 10, and the upper surface of the bottom 3, between the lower edges of the adjustable slides 5, is made to slope abruptly toward both of the sides from the middle. This form is given to the bottom 3 by providing a strip 11 of triangular cross section running longitudinally of the bottom in its middle. This strip 11 is of such width that its abruptly sloping surfaces extend almost under the adjustable slide 5. Outside these adjustable slides 5, the bottom 3 is made to slope abruptly upwardly and outwardly but to an extent considerably less than the upward extension of the bottom between the sides, interiorly of the box. This abrupt upward and outward slope is given to the bottom by providing strips 12 of triangular cross section, extending longitudinally of the bottom, from end to end, in such position that their inner sloping sides extend to about the point where the adjustable slides 5 would meet the bottom of the box, if adjusted downwardly to a sufficient extent. The bottom 3 extends laterally past these strips 12 for a considerable distance, and is provided along its termination at each side with an upwardly extending barrier 13 of such height and in such proximity to the opening between the bottom and the lower ends of the side that it presents an efficient hindrance to the insertion of the feet of the bird. It will thus be seen that grain, such as corn or wheat or other feed, such as peas, beans or chopped or ground feed, when placed in the hopper constituted by the box with its downwardly converging sides, will be caused to divide by the ridge formed by the triangular strip 11, and to pass laterally outward in both directions to the lower edges of the slides where it may pass through the spaces left between these lower edges of the slides and the upper surface of the bottom, and will then encounter abruptly upwardly and outwardly sloping surfaces on the inner sides of the triangular strips 12, so that in order to leave the box it must finally pass upwardly. Thus, with the spaces or throats adjusted properly by means of the adjustable slides 5, the feed will remain in the box in such condition that it will always be supplied through the throat as fast as those particles which are projecting through the throats are removed by the birds, but will not be caused, merely by the action of gravity, to flow through the throats faster than consumed by the birds, and thus be liable to be wasted.

The barrier 13 being positioned as above described, preventing the insertion of the bird's feet, imposes upon the bird the necessity of only removing the feed from the box with its beak, thus insuring that the bird will remove only such feed as is eaten, supplying the bird with the full amount of feed required but preventing either the excessive withdrawal of feed which the bird does not eat, or the contamination of the feed by scattering on the ground or floor and by contact by the feet of the bird, which feed, if eaten, does not conduce to the best results. While thus efficiently guarding against waste and maintaining the feed supplied to the birds in sanitary condition, no hindrance is offered to the ready feeding of the birds, since all birds and poultry with which it is desired to exercise care in feeding, such as chickens and other fowls and pigeons, may readily insert their beaks into the space immediately over the triangular strip 12 and remove the feed therefrom with their beaks as rapidly as required.

The ends 2 of the box have their upper edges inclined laterally in both directions from the middle and the lid of the box is constructed of two pieces 14 and 15 meeting at an angle conforming to the inclination of the upper edges of the ends 2, the joint being covered by a suitable molding 16, as shown, these pieces being secured to battens 17 adapted to extend transversely of the box, immediately outside the ends, when the lid is closed, and forming hinged connection between the lid and box by means of studs, in the form of screws 18, inserted through these battens into the ends of the box near one side. This lid extends to a considerable distance beyond the box at the ends and at the sides, so that it forms ample shelter over the sides of the box where the feed is procured, and over the ends of the box, on which suitable vessels for containing water are mounted, as shown. Thus constructed, the lid substantially surrounds the upper part of the box, when closed, forming a particularly effective covering for the prevention of the entrance of water into the box at the top. Extending out over the sides of the box and forming a shelter over the part of the bottom extending laterally past the sides, as above mentioned, it effectually prevents the entrance of water at the bottom. At the same time, hinged in the manner described, it is adapted to remain in raised position when opened, as is best illustrated in Fig. 2 of the drawings, and thus add to the convenience in using the feed box.

The simplicity of construction of the entire device allows it to be economically produced and to be lasting, as well as efficient in operation. By providing the adjustable slides 5 so that the width of the throat may be varied, all sizes of grain or particles of feed may be fed with equal facility.

Having thus fully described my invention, what I claim as new and desire to secure by Letters Patent is:

In an adjustable feed box, a bottom 3, ends 2 connected thereto, downwardly and inwardly converging sides 1 extending downwardly toward said bottom leaving openings or spaces 4 between the upper surface of the bottom and the lower edges of said sides, adjustable slides 5, mounted upon the inner surface of said sides and converging inwardly and downwardly, said sides having vertical slots 7, and said slides having bolts 6 extending through said slots 7, thumb nuts 8 on the outside thereof to secure said slides in adjusted position from the outside, pairs of wire guides 9 secured to the inner surfaces of said ends 2, said slides 5 having their ends grooved to receive said guides whereby the slides are held at all times in proper relation to the sides 1; a triangular longitudinal strip or guide 11 extending centrally and lengthwise of said bottom to direct the flow of the feed outwardly, triangular strips forming stops 12 upon said bottom outside of the lower ends of said slides, vertically disposed barriers 13 outside of said stops 12, and a movable roof for the device, substantially as set forth.

FREDERICK A. ZIMMER.

Witnesses:
JAMES N. RAMSEY,
CLARENCE PERDER.